United States Patent [19]
Forler et al.

[11] 3,914,145
[45] Oct. 21, 1975

[54] METHOD AND APPARATUS FOR REPAIRING CRACKS IN PLATE GLASS

[75] Inventors: C. Richard Forler, Littleton; Conrad F. Heins, Denver, both of Colo.

[73] Assignee: The Glass Doctor, Inc., Carrollton, Tex.

[22] Filed: June 11, 1973

[21] Appl. No.: 368,637

[52] U.S. Cl. .................. 156/98; 29/402; 264/36; 425/12; 427/140
[51] Int. Cl.² ........................................ B32B 35/00
[58] Field of Search ......... 264/36; 117/2 R; 156/94, 156/98; 29/402; 425/11, 12; 249/108, 90

[56] References Cited
UNITED STATES PATENTS
2,313,110  3/1943  Wertz ............................. 264/36
2,955,952  10/1960  Herbst ........................... 117/2 R
3,562,366  2/1971  Sohl ............................... 264/36 X
3,713,926  1/1973  Speer ............................. 156/98

*Primary Examiner*—Edward G. Whitby
*Attorney, Agent, or Firm*—Sheridan, Ross & Fields

[57] ABSTRACT

Method and apparatus for repairing plate glass, in situ, while disposed in a vertical position, having a generally conical cavity therein extending between opposite faces thereof, characterized by filling the cavity with a liquid prepolymer, while displacing air therein, until all air has been displaced, and thereafter curing the prepolymer to form a solid, transparent, bonded resin plug filling the cavity.

9 Claims, 7 Drawing Figures

METHOD AND APPARATUS FOR REPAIRING CRACKS IN PLATE GLASS

BACKGROUND OF THE INVENTION

A common type of damage to plate glass installed in store fronts, picture windows and the like, is a cavity formed by impact of a hard object which is relatively small at the point of impact and widens generally conically. The cavity or hole in the pane is not only unsightly but forms a focal point from which cracks may emanate, the growth of which may eventually require replacement of the pane at considerable cost. As will be apparent, if such damage could be repaired while the pane remained in situ, considerable economies could be effected.

SUMMARY OF THE INVENTION

The present invention is characterized, briefly, by providing a flat plate for closing the base of the cone-shaped cavity and introducing a transparent liquid prepolymer into the cavity while simultaneously displacing air therein, whereby the cavity and any cracks emanating therefrom are completely filled with the liquid after which the liquid is caused to polymerize into a transparent solid. In a preferred form of the invention the plate is provided with a liquid reservoir and is disposed below the cavity and thence slid upwardly permitting the liquid to flow into the cavity. After filling the cavity it is further slid upwardly, thus disposing a flat surface across the base of the cone which is in the same plane as the glass pane. In another form a flat plate is fixed to the pane over the base of the cone and liquid is introduced at the bottom of the cone, a suitable air vent being provided from the top of the cone to permit release of air from the cavity. The small aperture at the apex of the cone at the opposite side of the cone may be closed by a flat tape, or a dam may be erected around the aperture to permit liquid to flow into a reservoir formed by the dam. Surplus material is removed from a face, or both faces of the pane after the prepolymer has set or gelled followed by curing, preferably by actinic radiation.

In accordance with the foregoing, the principal object of the invention is to provide methods and apparatus for repairing a generally conical cavity in a plate glass panel while it is disposed in its vertical installed position.

Another object is to provide alternative techniques and apparatus for effecting such repair.

Still further objects, advantages and salient features will become more apparent from the detailed description, the appended claims, and the accompanying drawing to now be briefly described.

DETAILED DESCRIPTION OF PREFERRED EMBODIMENT

Figure 1:
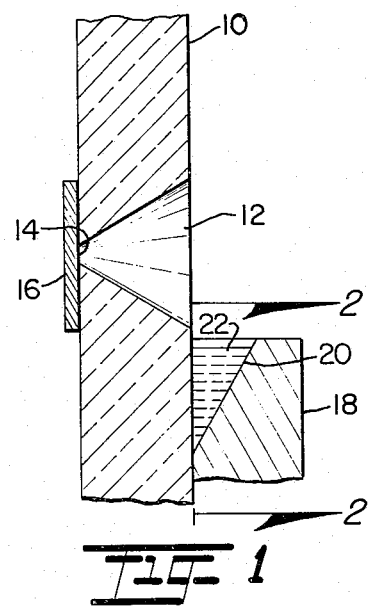
FIG. 1 is a vertical section through a damaged plate glass panel, illustrating apparatus for effecting a repair to a cavity.

Referring to the drawing and first to FIG. 1, damaged plate glass 10 is illustrated with a generally conical cavity 12 the apex of which is formed with a small aperture 14 at the point of impact by a hard pellet, such as a rock, or the like. In glass of a thickness commonly employed for building picture windows, aperture 14 may typically be of a cross-sectional size of the order 2–3 mm and the base of the cone of the order of 10–15 mm. In thicker plate glass, such as employed for doors, the base of the cone is proportionately larger. Also, minor cracks (not shown) may emanate outwardly from the surface of the cone. In the processes to now be described, which are essentially the same except for techniques, loose particles of glass are removed from the damaged area with a pointed probe, it is then cleaned with a solvent, and after drying of same a liquid prepolymer is slowly introduced into the lowermost portion of the conical cavity, displacing air therein, which escapes from the uppermost portion of the cavity in such manner that no air voids or bubbles remain in the damaged area. The prepolymer is then caused to polymerize and bond to the glass, thereby forming an interface without air. Preferably, the polymerized repair should have an index of refraction closely approaching that of the glass whereby the interface is invisible or substantially so.

EXAMPLE I

Figure 1A:
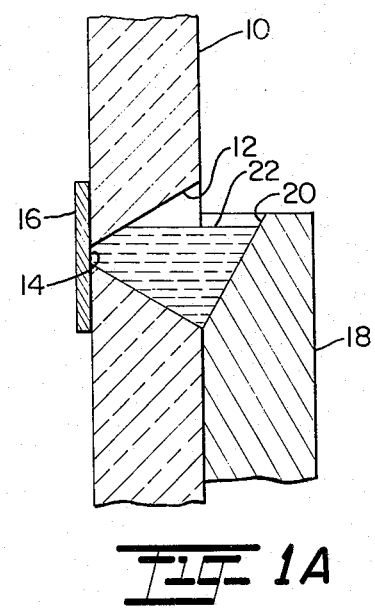
FIG. 1A is a like section during the filling of the cavity.
Figure 1B:
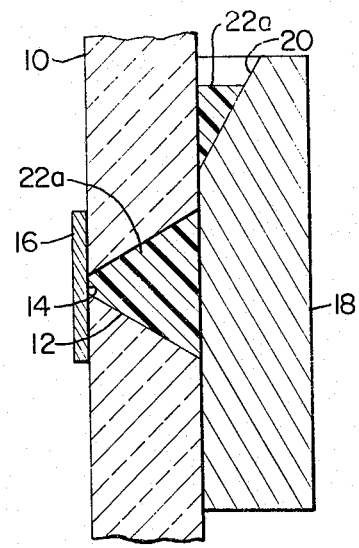
FIG. 1B is a like section after filling the cavity.

Referring to FIGS. 1, 1A, 1B and 2, a strip of tape 16, such as Magic scotch tape, is adhered to glass 10, covering aperture 14. A smooth flat block 18, having a tapered reservoir 20, is placed against the glass at a position slightly below the bottom of cavity 12 and the liquid 22 is introduced into the reservoir. The block is then very slowly slid upward, allowing the liquid to run into the cavity. As illustrated in FIG. 1A, liquid 22 has displaced all of the air below the liquid level and air above the liquid level is still escaping. As upward movement continues, the level continues to rise until all air is displaced and the cavity is completely filled. FIG. 1B illustrates dam 18 in its final position with reservoir 20 above the cavity at which position it is suitably held against the glass, such as by scotch tape, until the liquid gels sufficiently to remove the dam. The dam is preferably of transparent material so that filling of the cavity may be observed. Also it may be coated with a thin film, such as MYLAR to facilitate parting from the glass and from the remaining solidified material 22a in the reservoir, which latter may be cut free from the glass with a razor blade. Tape 16 is, of course, also removed after gelling and the repair is permitted to cure to its final form.

EXAMPLE II

Figure 3:
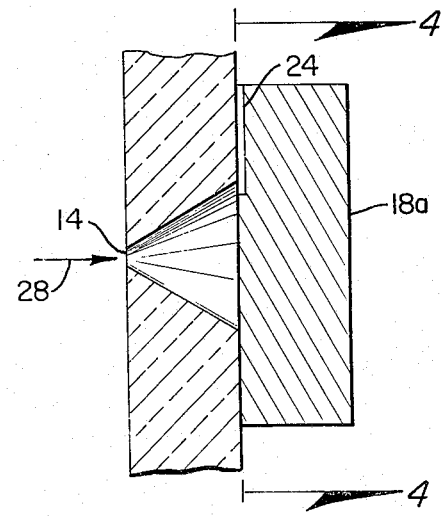
FIG. 3 is a section like FIG. 1, illustrating an alternative form of repair apparatus.

Referring to FIG. 3, a dam 18a, having a vent channel 24 in the face thereof, is secured to the glass with the lower end of the channel disposed slightly below the upper end of the cavity. The liquid is introduced through aperture 14, such as by a syringe, as indicated by arrow 28 until liquid flows from the upper end of vent 24. Flow is then discontinued and aperture 14 is maintained closed by the syringe until the material sets.

The syringe and dam may then be removed and the material formed in the vent channel may be removed from the glass with a razor blade.

EXAMPLE III

Figure 4:
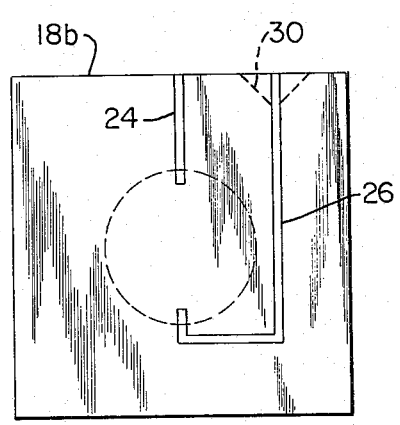
FIG. 4 is a section taken on line 4—4, FIG. 3.

Referring to FIG. 4, dam 18b is like dam 18a in that it is provided with a like vent 24. It differs however in that a liquid supply channel 26 is provided which extends from the top of the dam to a point slightly above the lowermost point in the cavity. The circular dotted line in FIG. 4 indicates the base of the cone cavity and the manner in which the lower end of channels 24 and 26 communicate therewith. In this process aperture 14 is closed with tape, as in FIG. 1, and liquid is introduced into the upper end of channel 26 and until it rises to the upper end of channel 24. If desired, the upper end of channel 26 may be enlarged somewhat as indicated by dotted line 30 to facilitate introduction of the liquid.

EXAMPLE IV

Figure 5:
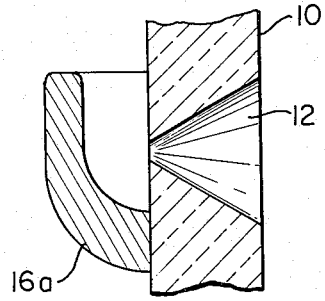
FIG. 5 is a section like FIG. 1, illustrating an alternative form of apparatus.
Figure 2:
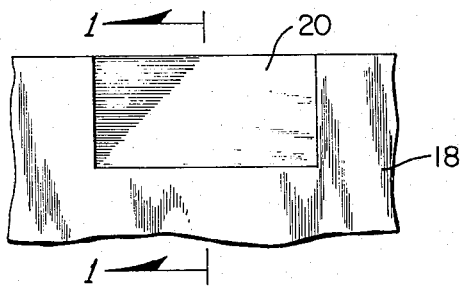
FIG. 2 is a section taken on line 2—2, FIG. 1.

Referring to FIG. 5, the apparatus employed is like that of FIGS. 1, 2 or 4 except that a reservoir 16a, formed of putty, moulding clay or other pliable material is employed in lieu of tape 16. With this construction the liquid flows through aperture 14 filling or partially filling the dam as cavity 12 is being filled. After the material therein has gelled or hardened, it is trimmed flush with the glass with a razor blade in the same manner as the excess material at the other face of the glass is removed. With this construction, due to flow of liquid through aperture 14, any possibility of trapping air within aperture 14, or adjacent thereto, may be obviated.

In any of the above examples the cavity is first cleaned with a cloth or swab preferably using a solvent such as acetone or Hexane. After cleaning, a 250W sunlamp may be disposed about six inches outwardly from the base of the cone and maintained for above five minutes to preheat the damaged area and evaporate the solvent. An exemplary polymerizable resin mixture which may be employed comprises:

| | |
|---|---|
| Liquid polyester resin | 8 parts by weight |
| Styrene | 2 parts by weight |
| Benzoyl peroxide | .03 parts by weight |
| Organosilane | .02 parts by weight | about 7 grams of the mixture, heated to 125°F, is mixed with about 0.15 gms. of 60% solution of 2-butanone hydroperoxide (MEK peroxide) in dibutylphthlate and about 0.15 gms. of a 1% solution of cobalt naphthenate in dibutylphthalate.

The liquid polyester resin is a combination of maleic anhydride, o - phthalic anhydride and methyl methacrylate having a Brookfield viscosity of about 20 poises at 25°C. This may be purchased from Rohm and Haas Co., Philadelphia, Pa. Reagent grade benzoyl peroxide may be obtained from Fisher Scientific Company, Pittsburg, Pa. The organosilane is a methacrylic acid ester of hydroxypropyltrimethoxysilane available from Dow Corning Co., Midland, Mich. Gellation will occur in about five minutes after which the plate may be removed and curing may be effected in about twenty minutes with a 250W sunlamp held about 6 inches from the repair. Surplus material on the glass is preferably removed with a razor blade while it is still in gel form.

What is claimed is:

1. Method of repairing an installed substantially vertical integral transparent plate glass panel, said panel having first and second spaced parallel planar surfaces without lamination reinforcement therebetween and a generally conical cavity therebetween formed by a broken-out piece of glass of like shape, the base of the cone being in the plane of the first surface and the apex thereof being disposed adjacent the second surface, comprising:
   a. removing loose particles of glass, if any, from the cavity through the base thereof,
   b. applying a readily manually removable closure having a flat surface to the first surface contiguous with the base of the cone and a surrounding portion of the first surface;
   c. delivering a transparent liquid prepolymer, first to the lower portion of the cavity, whereby the liquid level therein may rise and displace air therebelow;
   d. venting air above the liquid level from the uppermost portion of the cavity, whereby all air in the cavity is vented therefrom when the liquid level reaches the uppermost portion of the cavity;
   e. causing the liquid to polymerize into a solid conical plug; and
   f. removing the closure and surplus material on the first surface in the locus around the base of the cone.

2. Method in accordance with claim 1 wherein the closure is provided with a liquid reservoir at its top and the closure is slid upwardly along the first surface, transferring liquid from the reservoir to the cavity and forming a flat surface below the liquid level adjacent the cavity.

3. Method in accordance with claim 1 wherein the closure is applied to the first surface, in fixed position, and air is vented from the cavity through a channel in the closure communicating with the uppermost portion of the cavity.

4. Method in accordance with claim 1 wherein said apex is in the form of a small aperture extending through the second surface, into which the liquid flows at least to the plane of the second surface.

5. Method in accordance with claim 4 including delivering the liquid to the cavity through said aperture.

6. Method in accordance with claim 4 including applying a flat closure to the second surface, covering the outer end of the aperture, and delivering the liquid to the cavity from a locus adjacent the first surface.

7. Method in accordance with claim 4 including applying a dam to the second surface, forming a reservoir into which liquid may flow through the aperture, delivering the liquid to the cavity from a locus adjacent the first surface, and removing the material on the second surface which flows into the reservoir.

8. Apparatus for repairing an installed substantially vertical integral transparent plate glass panel, said panel having first and second spaced parallel planar surfaces without lamination reinforcement therebetween and a generally conical cavity therebtween formed by a broken-out piece of glass of like shape, the base of the cone being in the plane of the first surface and the apex thereof being disposed adjacent the second surface, comprising:
   a. a readily manually removable closure having a flat surface adapted to be applied to the first surface contiguous with the base of the cone and surrounding portion of the first surface;

b. means for delivering a transparent liquid prepolymer, first to the lower portion of the cavity, whereby the liquid level therein may rise and displace air therebelow; and c. means for venting air above the liquid level from the uppermost portion of the cavity, whereby all air in the cavity is vented therefrom when the liquid level reaches the uppermost portion of the cavity;

d. said closure being provided with a liquid reservoir at its top adapted to transfer liquid therefrom to the cavity as it is slid upwardly along the first surface and also form a flat surface below the liquid level adjacent the cavity.

9. Apparatus for repairing an installed substantially vertical integral transparent plate glass panel, said panel having first and second spaced parallel planar surfaces without lamination reinforcement therebetween and a generally conical cavity therebetween formed by a broken-out piece of glass of like shape, the base of the cone being in the plane of the first surface and the apex thereof being disposed adjacent the second surface, comprising:

a. a readily manually removable closure having a flat surface adapted to be applied to the first surface contiguous with the base of the cone and a surrounding portion of the first surface;

b. means for delivering a transparent liquid prepolymer, first to the lower portion of the cavity, whereby the liquid level therein may rise and displace air therebelow; and c. means for venting air above the liquid level from the uppermost portion of the cavity, whereby all air in the cavity is vented therefrom when the liquid level reaches the uppermost portion of the cavity, d. said closure adapted to be applied to the first surface in fixed position, means for delivering liquid to the bottom of the cavity, and an air vent channel in the closure communicating with the uppermost portion of the cavity.

* * * * *